(12) United States Patent
Thompson

(10) Patent No.: US 7,579,097 B2
(45) Date of Patent: *Aug. 25, 2009

(54) FUEL CELL VOLTAGE FEEDBACK CONTROL SYSTEM

(75) Inventor: Eric L Thompson, Honeoye Falls, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 216 days.

This patent is subject to a terminal disclaimer.

(21) Appl. No.: 10/222,353

(22) Filed: Aug. 16, 2002

(65) Prior Publication Data

US 2004/0033395 A1 Feb. 19, 2004

(51) Int. Cl.
 *H01M 8/04* (2006.01)
(52) U.S. Cl. .............................. 429/23; 429/22; 429/17; 702/60
(58) Field of Classification Search .................. 429/13, 429/17, 19, 22–24; 702/60
See application file for complete search history.

(56) References Cited

U.S. PATENT DOCUMENTS

| | | | |
|---|---|---|---|
| 4,988,283 A | | 1/1991 | Nagasawa et al. |
| 5,798,186 A | * | 8/1998 | Fletcher et al. ............... 429/13 |
| 6,358,638 B1 | * | 3/2002 | Rock et al. .................... 429/13 |
| 6,376,111 B1 | * | 4/2002 | Mathias et al. ................ 429/13 |
| 6,413,661 B1 | | 7/2002 | Clingerman et al. |
| 6,413,662 B1 | | 7/2002 | Clingerman et al. |
| 6,416,893 B1 | | 7/2002 | Clingerman et al. |
| 6,479,177 B1 | * | 11/2002 | Roberts et al. ................ 429/13 |
| 6,495,277 B1 | | 12/2002 | Edlund et al. |
| 6,581,015 B2 | | 6/2003 | Jones et al. |
| 6,764,780 B2 | * | 7/2004 | Roberts et al. ................ 429/13 |
| 2003/0186093 A1 | * | 10/2003 | St-Pierre et al. .............. 429/13 |
| 2004/0033396 A1 | * | 2/2004 | Thompson et al. ............ 429/13 |

FOREIGN PATENT DOCUMENTS

| | | |
|---|---|---|
| JP | 63-264876 | 11/1988 |
| JP | 07-029585 | 1/1995 |
| JP | 2000-208161 | 7/2000 |

OTHER PUBLICATIONS

Relevant page from PCT International Search Report dated Apr. 14, 2004.

* cited by examiner

*Primary Examiner*—Tracy Dove
(74) *Attorney, Agent, or Firm*—Harness, Dickey & Pierce, P.L.C.

(57) ABSTRACT

A method and apparatus according to the present invention controls current that is supplied to a load by a fuel cell stack. A minimum voltage of a plurality of fuel cells in a fuel cell stack is monitored. The current load supplied by the fuel cell stack is increased if the minimum fuel cell voltage value exceeds a first voltage value. The current load supplied by the fuel cell stack is decreased if the minimum fuel cell voltage value is less than a second voltage value. The current load supplied by the fuel cell is maintained if the minimum fuel cell voltage is between the first and second voltage values. The current load is increased and decreased based upon a difference between the minimum fuel cell voltage and the first voltage value.

6 Claims, 8 Drawing Sheets

FUEL CELL VOLTAGE FEEDBACK CONTROL SYSTEM

FIELD OF THE INVENTION

The present invention relates to fuel cells, and more particularly to a fuel cell voltage feedback control system for a fuel cell stack.

BACKGROUND OF THE INVENTION

Fuel cells generate power that can potentially be used in a variety of different applications. Fuel cells may eventually replace internal combustion engines in automobiles and trucks. Fuel cells may also power homes and businesses. There are many different types of fuel cells. For example, a solid-polymer-electrolyte membrane (PEM) fuel cell includes a membrane that is sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). Because the membrane is proton conductive and dielectric, the protons are transported through the membrane. The electrons flow through an electrical load that is connected across the electrodes. In a second half-cell reaction, oxygen ($O_2$) at the cathode reacts with protons ($H^+$) and electrons ($e^-$) are taken up to form water ($H_2O$).

During development of fuel cell systems for specific applications such as vehicles, an operator such as an engineer or technician monitors the starting and operation of the fuel cell stack under controlled conditions. The operator manually controls stack operating parameters such as reactant and cooling flow rates and temperatures and a current load applied to the fuel cell stack. More recently, fuel cell stack testing equipment has automated some testing of fuel cell stacks. The operator is not required to be present when the fuel cell stack is operated in medium to high output modes. When the fuel cell stack is tested at lower output modes, the operator should be present during operation.

There is an optimum amount of reactant gas that should be supplied to the fuel cell stack to support a desired current load. Usually control systems deliver an additional amount of reactant gas to the fuel cell stack to account for system leaks and inefficiencies and to allow the fuel cell stack to perform more smoothly. When fuel cell stacks are installed as powerplants in vehicles, the extra reactants that are supplied to the fuel cell stack require larger fuel cell stack components and decrease the efficiency of the fuel cell stack. These factors lead to greater production costs due to the larger components. Operating costs are also increased due to the additional reactant gas. Testing and research is currently being performed on fuel cell stacks to lower the additional reactants that are supplied to the fuel cell stack.

During testing to determine the precise amount of reactants that are required, the fuel cell stack is often operated in a low or relatively weak performance mode. Sometimes the fuel cell voltage output drops to zero or reverses potential, both of which can cause damage to the MEA of the fuel cell stack. The operator usually monitors the fuel cell stack during this type of testing even if automated testing equipment is available. When the fuel cell voltage drops quickly or reverses potential, the operator must act quickly to shut down the fuel cell stack to prevent damage.

There are other situations where precise control of the fuel cell stack is needed. The fuel cell stack can be started easily at or near room temperature. At these temperatures, the fuel cell stack provides full rated current relatively quickly, typically within 5-8 seconds following the delivery of reactants. When the temperature of the fuel cell stack is near or below freezing, care should be taken when starting the fuel cell stack to avoid damage. When the current load increases before thawing, individual fuel cells within the fuel cell stack may fail.

The failure of the individual fuel cells prevents the fuel cell stack from supplying the full rated current load. The residual frozen water slows reaction rates because fewer active sites are available for reaction. Rapid increases in the current load cannot be handled by the frozen fuel cell stack.

SUMMARY OF THE INVENTION

A method and apparatus according to the present invention controls current that is supplied to a load by a fuel cell stack. A minimum voltage of a plurality of fuel cells in a fuel cell stack is monitored. The current load that is supplied by the fuel cell stack is increased if the minimum fuel cell voltage value exceeds a first voltage value.

In other features of the invention, the current load that is supplied by the fuel cell stack is decreased if the minimum fuel cell voltage value is less than a second voltage value. The current load that is supplied by the fuel cell is maintained if the minimum fuel cell voltage is between the first and second voltage values. The current load is increased, decreased or maintained based upon a difference between the minimum fuel cell voltage and the first and second voltage values.

In still other features of the invention, an open circuit voltage of the fuel cell stack is measured before supplying current to the load. The open circuit voltage value is compared to a desired open circuit voltage value. Operation of the fuel cell stack is terminated if the open circuit voltage value does not exceed the desired open circuit value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The fuel cell control system according to the present invention controls a current load that is supplied by the fuel cell by monitoring a minimum fuel cell voltage of fuel cells in the fuel cell stack. The minimum fuel cell voltage is compared to first and second voltage values. Based on a difference between the minimum fuel cell voltage and the first and second voltage values, the fuel cell control system increases, decreases or maintains the current load that is supplied by the fuel cell stack.

The fuel cell control system according to the present invention will be described in conjunction with a procedure for starting a frozen fuel cell. The control system, however, may also be used for other purposes. For example, the fuel cell control system can be used to monitor fuel cell stacks during developmental testing. In particular, the fuel cell control system is particularly useful for testing at low output modes to identify a precise amount of reactant gas that is required to operate the fuel cell for optimization of fuel efficiency.

During startup, rapid increases in the current load cannot be handled by a frozen fuel cell stack. The frozen fuel cell stack, however, can supply lower current loads. The current load that is supplied should be low enough to prevent a reverse bias voltage across any of the fuel cells. As the fuel cell stack supplies the lower current loads, heat spreads through the fuel cell stack. The temperature of the fuel cell stack and the number of available active sites increase over time. The current load that can be supplied by the fuel cell stack also increases over time. The membrane of the fuel cell stack heats up relatively quickly after current is produced. A bipolar plate, however, remains at lower temperatures for a longer duration. Water freezing on the bipolar plate can cause additional problems if not accommodated by the starting method of the fuel cell control system.

Figure 1:
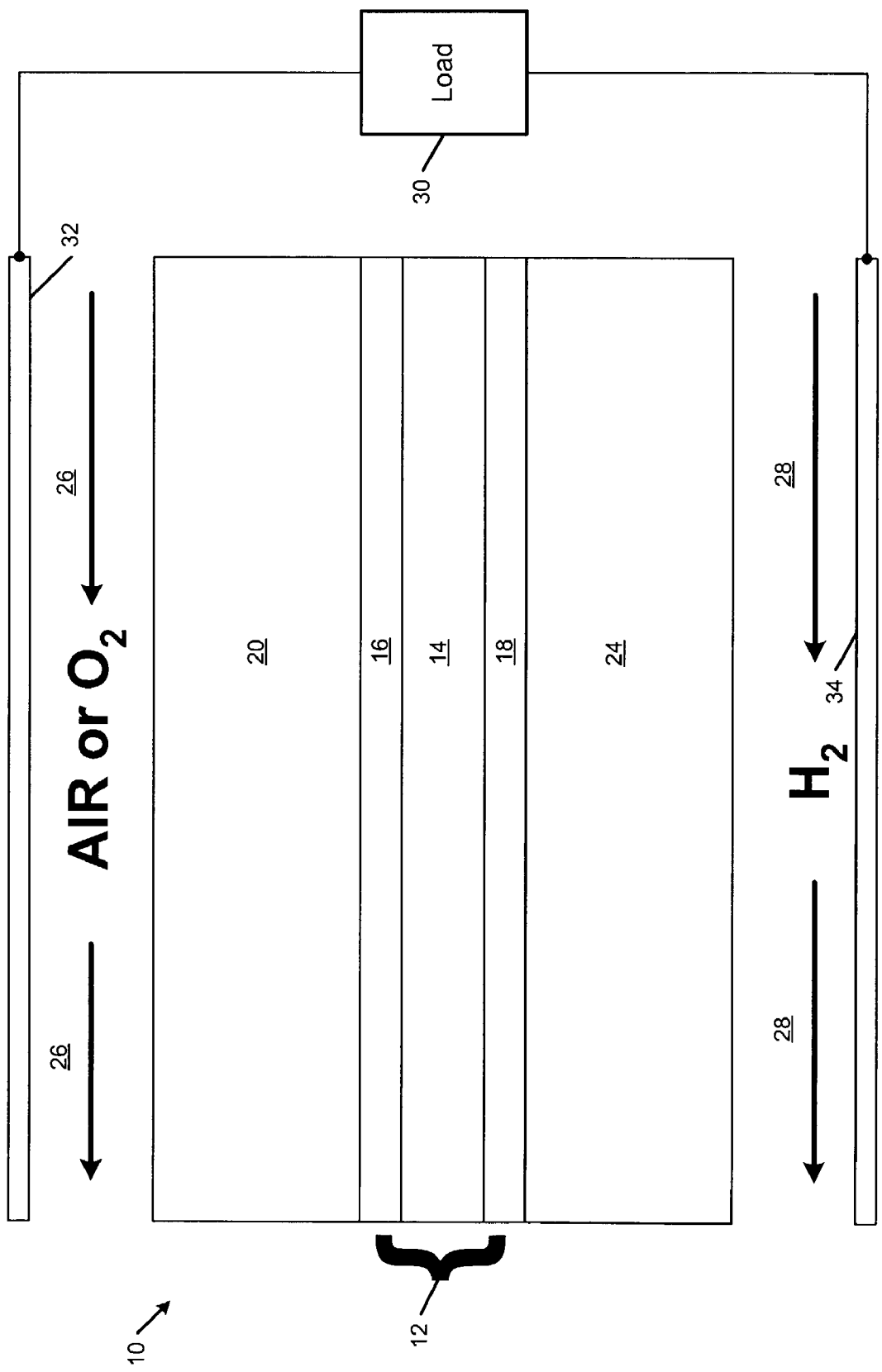
FIG. 1 illustrates a cross-section of a membrane electrode assembly (MEA) of a fuel cell.

Referring now to FIG. 1, the present invention will be described in conjunction with a fuel cell 10 that includes a membrane electrode assembly (MEA) 12. Skilled artisans will appreciate that other types of fuel cells are contemplated and may be employed without departing from the invention. Preferably, the MEA 12 is a proton exchange membrane (PEM). The MEA 12 includes a membrane 14, a cathode 16, and an anode 18. The membrane 14 is sandwiched between the cathode 16 and the anode 18.

A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs air or oxygen ($O_2$) from a source to the cathode diffusion medium 20. The anode flow channel 28 receives and directs hydrogen ($H_2$) from a source to the anode diffusion medium 24.

In the fuel cell assembly 10, the membrane 14 is a cation permeable, proton conductive membrane having $H^+$ ions as the mobile ion. The fuel gas is hydrogen ($H_2$) and the oxidant is oxygen or air ($O_2$). The overall cell reaction is the oxidation of hydrogen to water and the respective reactions at the anode 18 and the cathode 16 are as follows:

$$H_2 = 2H^+ + 2e^-$$

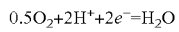

$$0.5O_2 + 2H^+ + 2e^- = H_2O$$

Since hydrogen is used as the fuel gas, the product of the overall cell reaction is water. Typically, the water that is produced is rejected at the cathode 16, which is a porous electrode including an electrocatalyst layer on the oxygen side. The water may be collected as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across a first plate 32 and a second plate 34 of the MEA 12 to receive the electricity. The plates 32 and/or 34 are bipolar plates if a fuel cell is located adjacent to the respective plate 32 or 34 or end plates if a fuel cell is not adjacent thereto.

Figure 2:
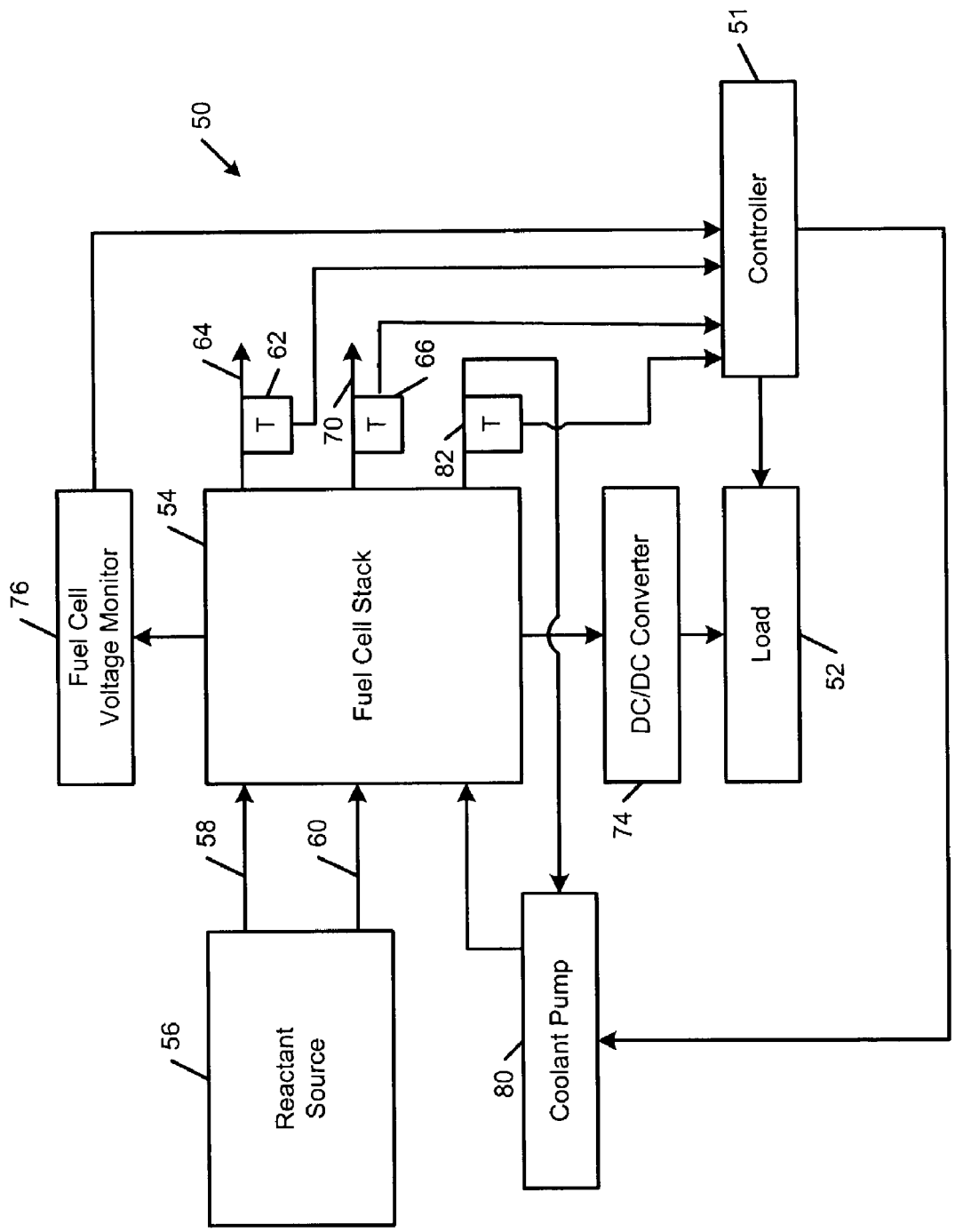
FIG. 2 is a functional block diagram of an exemplary control system for a fuel cell stack according to the present invention.
Figure 3A:
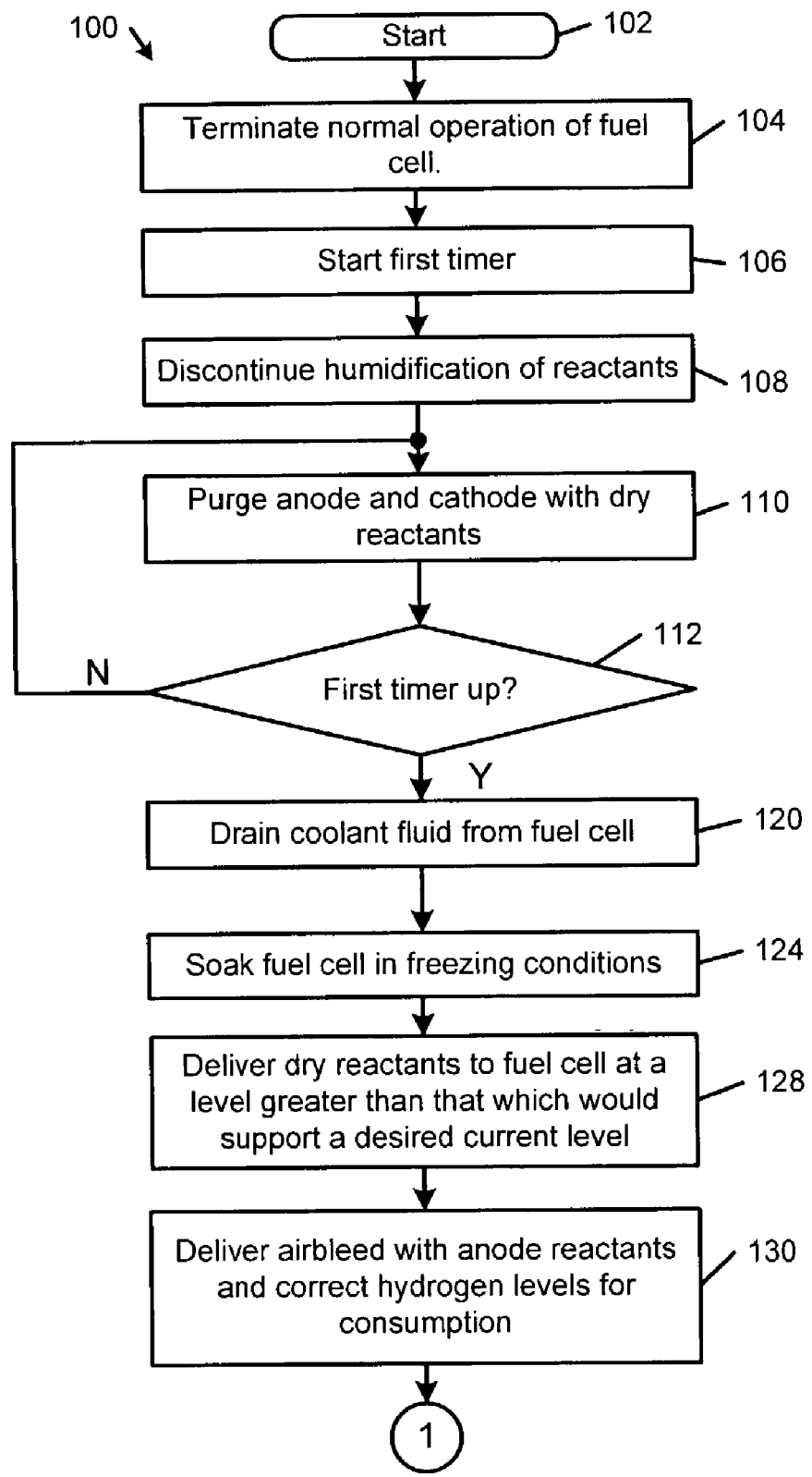
FIGS. 3A, 3B, 3C and 3D are flowcharts illustrating steps for starting a frozen fuel cell stack that are performed by the control system of FIG. 2.
Figure 3B:
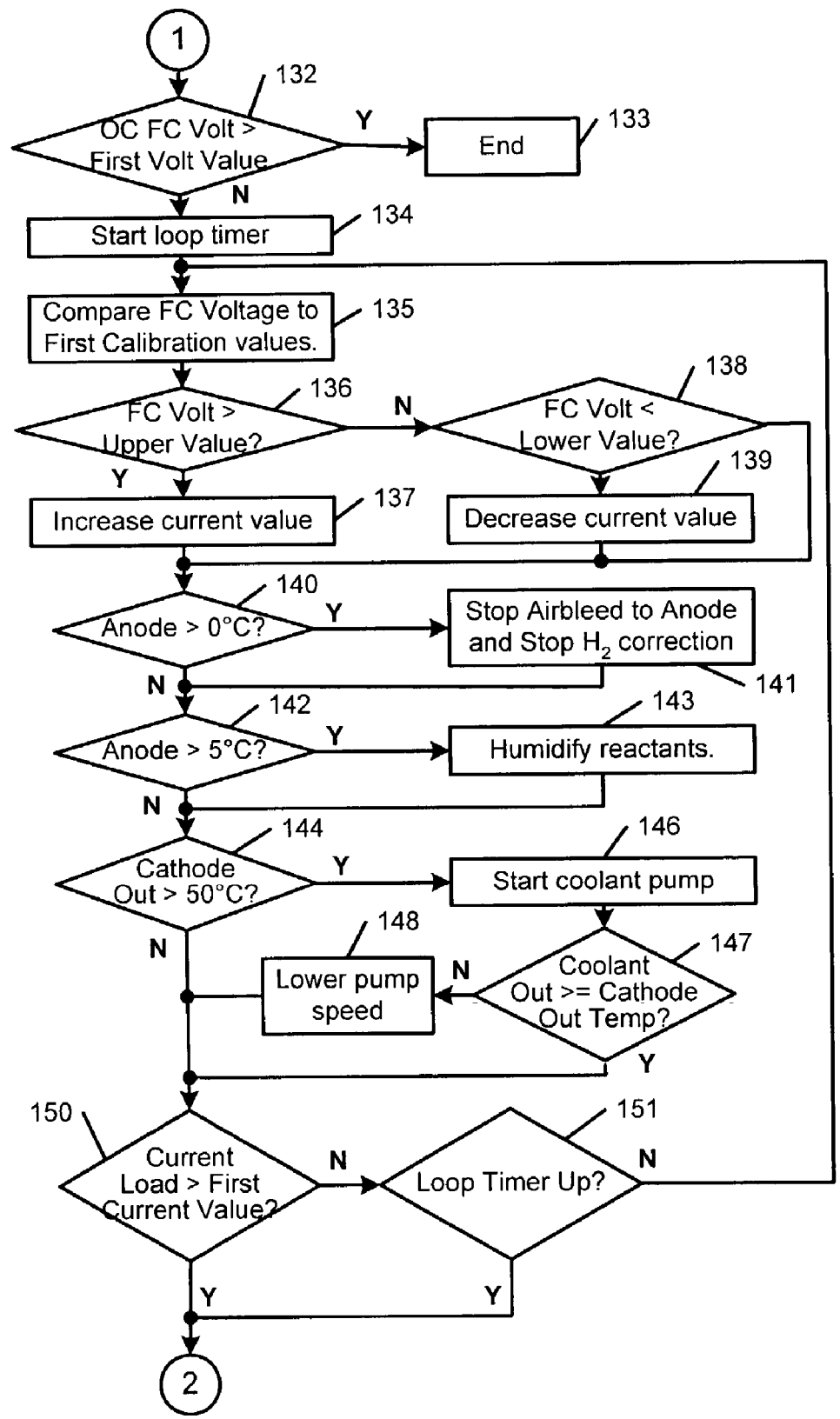
Figure 3C:
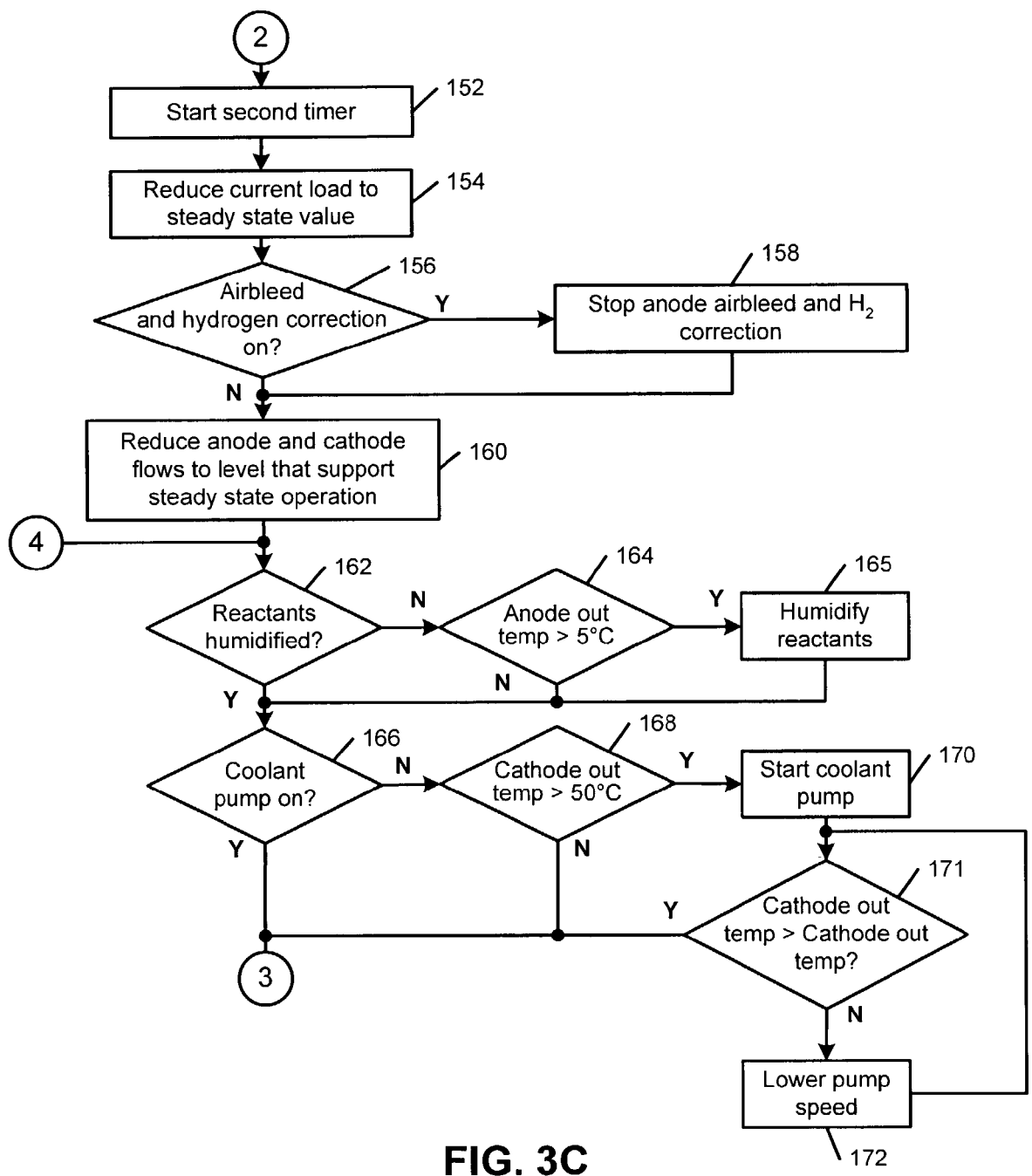
Figure 3D:
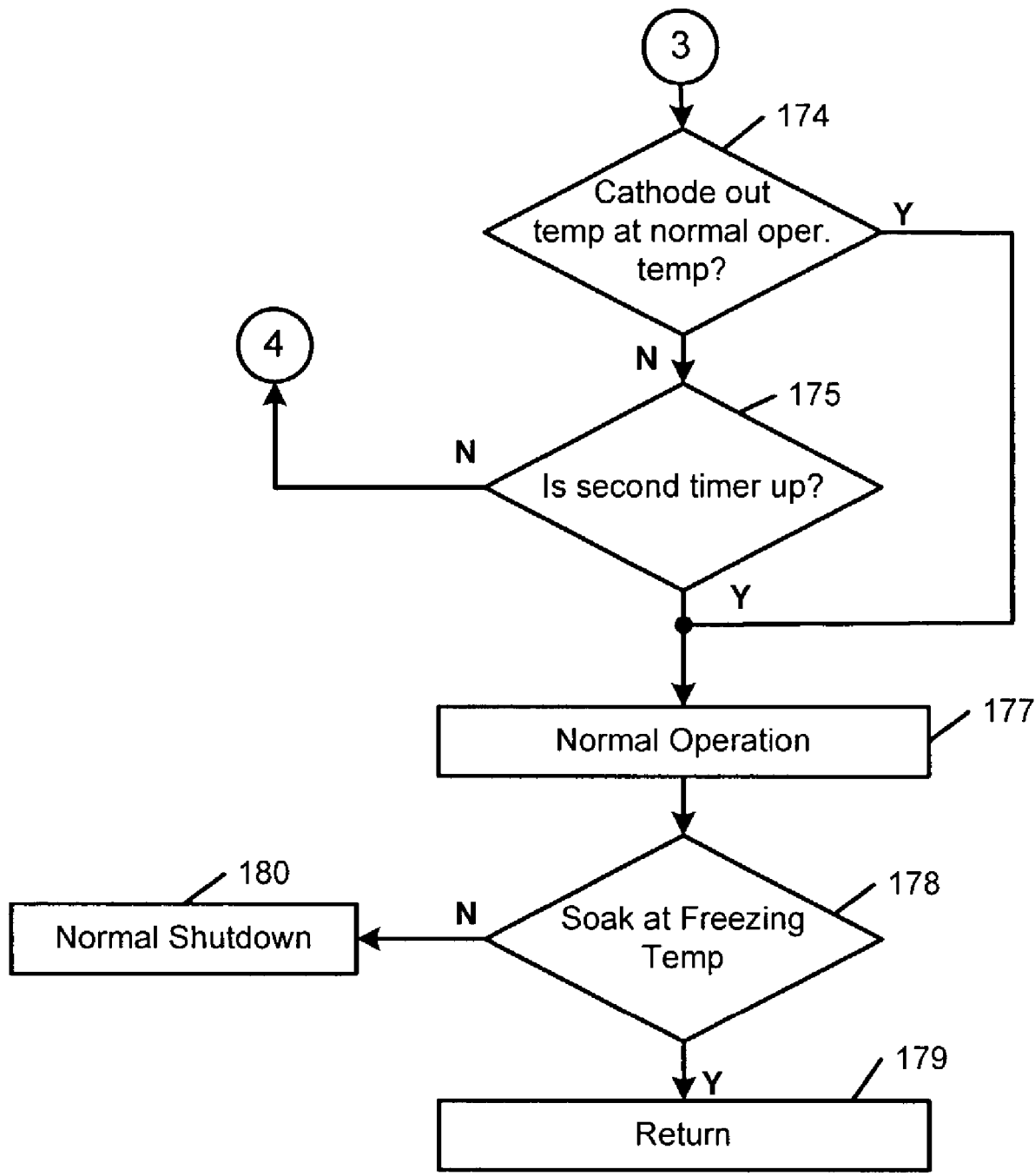

Referring now to FIG. 2, an exemplary control system 50 for a fuel cell stack includes a controller 51 that is connected to a load 52. A fuel cell stack 54 supplies current to the load 52. The controller 51 controls the current that is supplied by the fuel cell stack 54 during testing, starting a frozen fuel cell stack or in other suitable circumstances based upon a minimum cell voltage performance.

Reactants 56 are supplied to an anode inlet 58 of the fuel cell stack 54. In a preferred embodiment, the reactants 56 that are supplied to the anode inlet 58 include hydrogen or reformate. Reactants 56 are supplied to a cathode inlet 60 of the fuel cell stack 54. In a preferred embodiment, the reactants 56 that are supplied to the cathode inlet 60 include air or oxygen. A humidifier or other device (not shown) selectively controls the humidification of the reactants. The humidifier or other device is typically located between the reactant source 56 and the fuel cell stack 54.

A first temperature sensor 62 monitors the temperature of an anode outlet 64. A second temperature sensor 66 monitors the temperature of a cathode outlet 70. The first and second temperature sensors 62 and 66 are preferably connected to the controller 51 and provide first and second temperature signals that are related to the temperature of the anode outlet 64 and the cathode outlet 70, respectively. The output of the fuel cell stack 54 is connected to a DC/DC converter 74 that is connected to the load 52. A fuel cell voltage monitor 76 monitors the voltage of each fuel cell, groups of fuel cells (such as 4 fuel cells), and/or the entire fuel cell stack 54. In a preferred mode, the fuel cell voltage monitor 76 monitors the voltage of each fuel cell in the fuel cell stack 54. A coolant pump 80 pumps coolant from an outlet to an inlet of the fuel cell stack 54. A temperature sensor 82 is located adjacent to the outlet of the fuel cell stack and is connected to the controller 51. The controller 51 operates the coolant pump.

To further illustrate the present invention, a method for starting a frozen fuel cell will be described. The present invention, however, has additional applications such as when testing or in other suitable situations. Referring now to FIGS. 3A-3D, a method for starting a frozen fuel cell stack is illustrated and is generally designated 100. Control begins with step 102. In step 104, the controller 51 terminates normal operation of the fuel cell stack 54. In step 106, the controller 51 starts a first timer. In step 108, the controller 51 discontinues humidification of the reactants 56. In step 110, the controller 51 purges the anode and cathode of the fuel cell stack 54 with dry reactants. In a preferred embodiment, the anode and cathode are each purged with 0.1 to 25 sccm/cell/cm$^2$ for a period of 1 to 600 seconds. In a highly preferred embodiment, the anode and cathode are each purged with 8.71 sccm/cell/cm$^2$ for approximately one minute. In step 112, the controller 51 determines whether the first timer is up. If not, control loops to step 110.

All of the water is not necessarily removed from the fuel cell stack by the preceding steps. These steps preferably clear out the cell inlet areas that may have become blocked with ice. If the cell inlet areas are blocked by ice, startup is prevented. These steps also remove water from the reactant flow fields. In an alternative embodiment, a cathode air compressor (not shown) is used to deliver air to the anode and cathode (either simultaneously or in succession through the use of specialized plumbing) during the purge steps. Using the cathode air compressor eliminates hydrogen emissions and/or the need to combust the anode reactants downstream from the fuel cell stack 54, which is typically encountered if only reactants are used for purging. In addition, coolant contained in the flow field channels is also optionally removed at this time.

If the first timer is up, control continues with step 120 where the controller 51 drains coolant from the fuel cell stack 54. In step 124, the fuel cell stack 54 is soaked in freezing conditions. In other words, the fuel cell is turned off for a period at temperatures below 0° C.

Some time later, the operator of the vehicle restarts the fuel cell. In step 128, dry reactants are delivered to the fuel cell stack 54. Preferably the dry reactants are delivered at a level that will support a first predetermined current level. In this step, the dry reactants are preferably provided at a higher stoichiometry than the fuel cell stack would encounter while powering the vehicle. Air (airbleed) or $O_2$ up to 25% is delivered with the anode reactants. This causes an exothermic reaction with the hydrogen in the presence of the Pt coated MEA. The heat that is given off from this reaction facilitates the thawing of the fuel cell stack, increases reaction rates, and ultimately results in faster start times from frozen temperatures. The oxygen present in the anode side consumes some of the hydrogen that is normally present to dissociate and contribute to the fuel cell reaction that generates electricity. It is therefore necessary to account for this $H_2$ that is reacting with the $O_2$ by supplementing the anode supply with additional $H_2$ or reformate. In step 130, hydrogen levels are corrected for consumption by the fuel cell stack 54.

For example, if acceleration of the vehicle requires a maximum current density of 0.6 $A/cm^2$, a suitable current density for the initial reactant flows is approximately 0.8 $A/cm^2$. Delivery of the dry reactants is preferably at the lowest pressure that can be provided. The higher flow rate combined with the lower pressure creates maximum gas velocities through the fuel cell stack 54. The increased gas velocities improve entraining and removal of product and/or incident water. This will minimize the possibility that the product and/or incident water will freeze on the bipolar plate and block the flow of reactants through the fuel cell.

For example, delivery of the anode reactants with 25% airbleed and hydrogen that is corrected for consumption can be provided to warm the fuel cell in the early stages of the frozen start. The anode air bleed preferably remains present until the anode outlet temperature reaches 0° Celsius at which time the air bleed is closed and hydrogen consumption correction is no longer required. It is desirable to stop the air bleed into the anode at this temperature to ensure that the exothermic reaction ceases. This will prevent overheating and possible damage to the MEA.

The dry reactants are delivered until the anode outlet temperature reaches 5° C. At this point, the temperature in the fuel cell stack allows humidification of the reactants. Failure to humidify the fuel cell stack at this time reduces performance due to the drying of the membrane of the fuel cell stack. Also, coolant can begin to be circulated in the fuel cell stack when the cathode outlet temperature reaches 50° C. Since the coolant is cold and the fuel cell stack is comparatively warm at this time, it is desirable to stage or gradually build up the coolant flow rate as the coolant outlet temperature warms up. If the coolant pump is simply turned on at full speed, the cold rush of incoming coolant results in a significant decrease in stack voltage performance. It is therefore desirable to limit the initial coolant flow rate such that the coolant outlet temperature does not fall below a prescribed temperature. For example, the initial coolant flow rate should be controlled such that the coolant outlet temperature is always greater than the cathode outlet temperature. If this is not true, the coolant pumps speed and the coolant flow rate are reduced further.

In step 132, the controller 51 determines whether the open circuit (OC) fuel cell (FC) voltage is greater than a first value. Experimental data has shown that fuel cell stacks with weak open circuit voltage potential (at this point in the startup process) have a poor likelihood of successfully starting from subzero temperatures. In a preferred embodiment, the first predetermined voltage value is approximately 0.7 V or greater. If the open OC FC voltage is greater than a first value, control ends in step 133.

Otherwise, control starts a loop timer in step 134. In step 135, the controller 51 compares the fuel cell voltage to first calibration value(s). In step 136, if the fuel cell voltage is greater than the upper value, the controller 51 increases the current value in step 137. If the fuel cell voltage is less than a lower value as determined in step 138, the controller 51 decreases the current value in step 139.

In step 140, the controller 51 determines whether the anode temperature is >0° C. If it is, control continues with step 141 where the controller stops air bleed to the anode and stops hydrogen correction. If the anode temperature is not >0° C., the controller 51 determines whether the anode temperature is >5° C. in step 142. If it is, control continues with step 143 where the reactants are humidified. If the anode temperature is not >5° C., control continues with step 144 where the controller 51 determines whether the cathode outlet temperature is >50 degrees C. If it is, the controller 51 starts the coolant pump in step 146. In step 147, the controller 51 determines whether the coolant outlet temperature is greater than or equal to the cathode outlet temperature. If not, control continues with step 148 and lowers the pumps speed.

In step 150, the controller 51 determines whether the current load is greater than a first current value. If not, control determines whether a loop timer is up in step 151. If not, control continues with step 135. Otherwise, control continues from steps 150 and 151 to step 152 and starts a second timer. In step 154, control reduces current load to a steady-state value. In step 156, control determines whether the air bleed and hydrogen correction are on. If true, the controller 51 stops the anode air bleed and the hydrogen correction in step 158. Otherwise, control continues with step 160 where the anode and cathode flows are reduced to a level that supports steady-state operation.

In step 162, control determines whether the reactants are humidified. If not, the controller continues with step 164 and determines whether the anode outlet temperature is >5° C. If it is, control continues with step 165 where the reactants are humidified. In step 166, the controller 51 determines whether the coolant pump 80 is on. If not, the controller 51 determines whether the cathode outlet temperature is >50° C. in step 168. If true, the controller starts the coolant pump in step 170. In step 171, the controller determines whether the coolant outlet temperature is greater than the cathode outlet temperature. If not, control lowers the speed of the coolant pump 80 in step 172 and loops back to step 171.

In step 174, the controller 51 determines whether the cathode outlet temperature is at a normal operating temperature. If not, control continues with step 175 where the controller 51 determines whether the second timer is up. If not, control loops back to step 162. If the cathode outlet temperature is at a normal operating temperature or if the second timer is up, control continues with step 177 where normal operation is resumed. Control continues with step 178 where the controller 51 determines whether there is a soak at freezing temperature. If there is a soak at freezing temperature, control returns in step 179. Otherwise, control performs normal shutdown in step 180.

Figure 4A:
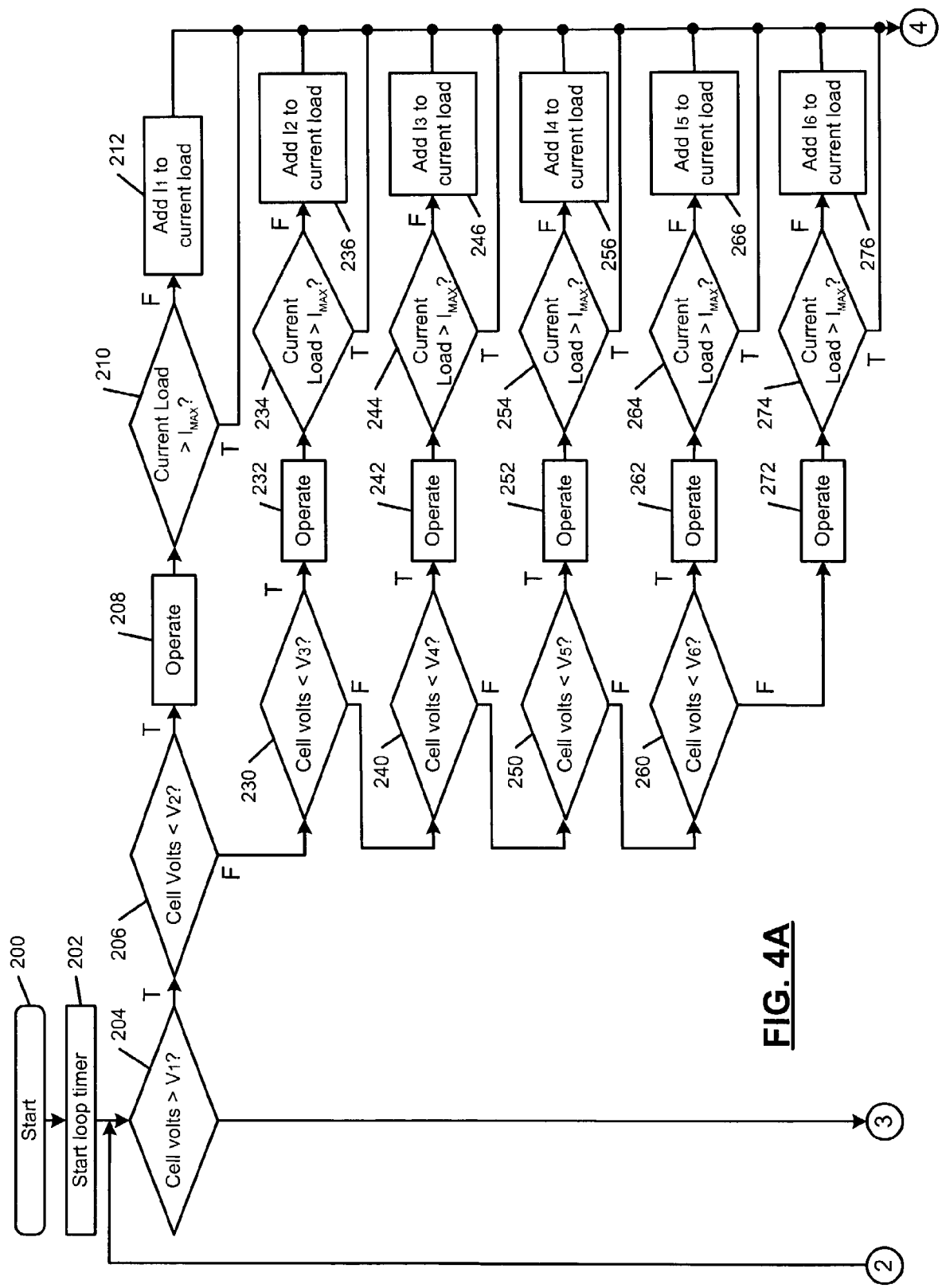
FIGS. 4A and 4B are flowcharts illustrating steps controlling current load based on a minimum fuel cell voltage.
Figure 4B:
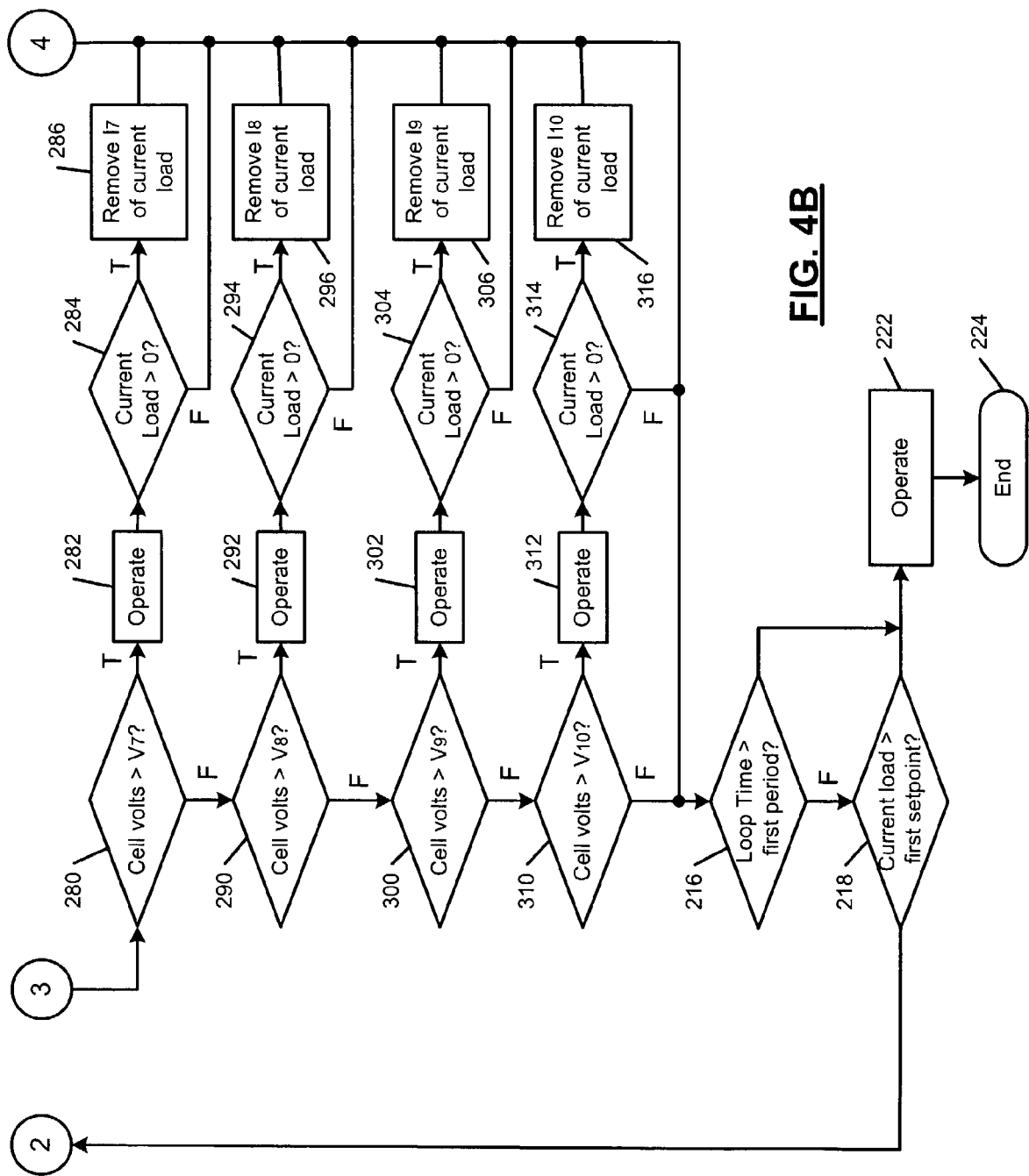

Referring now to FIGS. 4A and 4B, an exemplary method for increasing and decreasing the current load in incremental steps based on the fuel cell voltage is shown. Control begins with step 200. In step 202, a loop timer is started. In step to 204, the controller 51 compares the fuel cell voltage to a first voltage value $V_1$ such as 0.4V. If the fuel cell voltage is greater than the first voltage value $V_1$, control continues with step 206. In step 206, the controller 51 compares the fuel cell voltage to a second voltage value $V_2$ that is greater than the first voltage value $V_1$. If the fuel cell voltage is less than the second voltage value $V_2$, the fuel cell stack is operated in step 208. In step 210, the controller 51 compares the current load to a maximum current load $I_{MAX}$. In a preferred embodiment, the maximum current load $I_{MAX}$ is equal to 160 Amps. If the current load is not greater than the maximum current load $I_{MAX}$, control continues with step 212 where the controller 51 adds a first load value $I_1$ such as 4 Amps to the current load. In a preferred embodiment, step 212 adds only part of the first load value if the maximum load value would be exceeded. If the current load is greater than or equal to the maximum current load $I_{MAX}$, control continues from step 210 to step 216.

In step 216, the controller 51 determines whether the loop timer is up. If not, control continues with step 218 where the current load is compared to a second predetermined current load setpoint (normally $I_{Max}$). If the current load is greater than the second predetermined current load setpoint, control continues with step 222 where the fuel cell is operated and the method ends with step 224. If the current load is less than the first setpoint and the loop timer is not up, control continues with step 204.

If the fuel cell voltage is greater than the second voltage value $V_2$, control continues with step 230 where the control system 50 compares the cell voltage to a third voltage value $V_3$. The third voltage value $V_3$ is greater than the second voltage value $V_2$. If the fuel cell voltage is less than the third voltage value $V_3$, the fuel cell stack is operated in step 232. In step 234, the controller 51 compares the current load to the maximum current load $I_{MAX}$. If the current load is less than the maximum current load $I_{MAX}$, control continues with step 236 where the controller 51 adds a second load value $I_2$ that is greater than the first load value $I_1$. For example, if the first load value $I_1$ is 4 Amps, the second load value $I_2$ can be 5 Amps. In a preferred embodiment, step 236 adds only part of the second load value $I_2$ if the maximum load value $I_{MAX}$ would be exceeded. If the current load is greater than or equal to the maximum current load $I_{MAX}$, control continues from step 234 to step 216.

If the fuel cell voltage is greater than the third voltage value $V_3$, control continues with step 240 where the controller 51 compares the cell voltage to a fourth voltage value $V_4$. The fourth voltage value $V_4$ is greater than the third voltage value $V_3$. If the fuel cell voltage is less than the fourth voltage value $V_4$, the fuel cell stack 54 is operated in step 242. In step 244, the controller 51 compares the current load to the maximum current load $I_{MAX}$. If the current load is less than the maximum current load $I_{MAX}$, control continues with step 246 where the controller 51 adds a third load value that is greater than the second load value $I_2$. For example, if the second load value $I_2$ is 5 Amps, the third load value $I_3$ can be 6 Amps. In a preferred embodiment, step 246 adds only part of the third load value $I_3$ if the maximum load value $I_{MAX}$ would be exceeded. If the current load is greater than or equal to the maximum current load $I_{MAX}$, control continues from step 244 to step 216.

If the fuel cell voltage is greater than the fourth voltage value $V_4$, control continues with step 250 where the controller 51 compares the cell voltage to a fifth voltage value $V_5$. The fifth voltage value $V_5$ is greater than the fourth voltage value $V_4$. If the fuel cell voltage is less than the fifth voltage value $V_5$, the fuel cell stack 54 is operated in step 252. In step 254, the controller 51 compares the current load to the maximum current load $I_{MAX}$. If the current load is less than the maximum current load $I_{MAX}$, control continues with step 256 where the controller 51 adds a fourth load value $I_4$ that is greater than the third load value $I_3$. For example, if the third load value $I_3$ is 6 Amps, the fourth load value $I_4$ can be 7 Amps. In a preferred embodiment, step 256 adds only part of the fourth load value $I_4$ if the maximum load value $I_{MAX}$ would be exceeded. If the current load is greater than or equal to the maximum current load $I_{MAX}$, control continues from step 254 to step 216.

If the fuel cell voltage is greater than the fifth voltage value $V_5$, control continues with step 260 where the controller 51 compares the cell voltage to a sixth voltage value $V_6$. The sixth voltage value $V_6$ is greater than the fifth voltage value $V_5$. If the fuel cell voltage is less than the sixth voltage value $V_6$, the fuel cell stack is operated in step 262. In step 264, the control system 50 compares the current load to the maximum current load $I_{MAX}$. If the current load is less than the maximum current load $I_{MAX}$, control continues with step 266 where the control system 50 adds a fifth load value $I_5$ that is greater than the fourth load value $I_4$. For example, if the fourth load value $I_4$ is 7 Amps, the fifth load value $I_5$ can be 10 Amps. In a preferred embodiment, step 266 adds only part of the fifth load value $I_5$ if the maximum load value $I_{MAX}$ would be exceeded. If the current load is greater than or equal to the maximum current load $I_{MAX}$, control continues from step 264 to step 216.

If the fuel cell voltage is greater than the sixth voltage value $V_6$, control continues with step 272 where the fuel cell stack 54 is operated. In step 274, the controller 51 compares the current load to the maximum current load $I_{MAX}$. If the current load is less than the maximum current load $I_{MAX}$, control continues with step 276 where the controller 51 adds a sixth load value $I_6$ that is greater than the fifth load value $I_5$. For example, if the fifth load value $I_5$ is 10 Amps, the sixth load value $I_6$ can be 12 Amps. In a preferred embodiment, step 276 adds only part of the sixth load value $I_6$ if the maximum load value would be exceeded. If the current load is greater than or equal to the maximum current load $I_{MAX}$, control continues from step 274 to step 216.

If the fuel cell voltage is less than the first voltage value $V_1$, control continues from step 204 to step 280. In step 280, the control system 50 compares the fuel cell voltage to a seventh voltage value $V_7$. The seventh voltage value $V_7$ is less than the first voltage value $V_1$. If the fuel cell voltage is greater than the seventh voltage value $V_7$, control continues with step 282 where the fuel cell is operated. In step 284, the control system 50 compares the current load to zero. If the current load is greater than 0, control continues with step 286 where the controller 51 subtracts a seventh load value $I_7$. For example, seventh load value $I_7$ can be 1 Amp. In a preferred embodiment, step 286 subtracts only part of the seventh load value $I_7$ that is needed to reach zero if necessary. If the current load is equal to zero, control continues from step 284 to step 216.

If the fuel cell voltage is less than the first voltage value $V_1$ and the seventh voltage value $V_7$, control continues with step

290. In step 290, the controller 51 compares the fuel cell voltage to an eight voltage value $V_8$. The eighth voltage value $V_8$ is less than the seventh voltage value $V_7$. If the fuel cell voltage is greater than the eighth voltage value $V_8$, control continues with step 292 where the fuel cell is operated. In step 294, the control system 50 compares the current load to zero. If the current load is greater than zero, control continues with step 296 where the control system 50 subtracts an eighth load value $I_8$. For example, eighth load value $I_8$ can be 3 Amps. In a preferred embodiment, step 296 subtracts only part of the eighth load value $I_8$ that is needed to reach zero if necessary. If the current load is equal to zero, control continues from step 294 to step 216.

If the fuel cell voltage is less than the first voltage value $V_1$ and the eighth voltage value $V_8$ control continues with step 300. In step 300, the controller 51 compares the fuel cell voltage to a ninth voltage value $V_9$. The ninth voltage value $V_9$ is less than the eighth voltage value $V_8$. If the fuel cell voltage is greater than the ninth voltage value $V_9$, control continues with step 302 where the fuel cell is operated. In step 304, the controller 51 compares the current load to zero. If the current load is greater than zero, control continues with step 306 where the control system 50 subtracts a ninth load value $I_9$. For example, the ninth load value $I_9$ can be 5 Amps. In a preferred embodiment, step 296 subtracts only part of the ninth load value $I_9$ to reach zero if necessary. If the current load is equal to zero, control continues from step 304 to step 216.

If the fuel cell voltage is less than the first voltage value $V_1$ and the ninth voltage value $V_9$, control continues with step 310. In step 310, the controller 51 compares the fuel cell voltage to a tenth voltage value $V_{10}$. The tenth voltage value $V_{10}$ is less than the ninth voltage value $V_9$. If the fuel cell voltage is greater than the tenth voltage value $V_{10}$, control continues with step 312 where the fuel cell is operated. In step 314, the controller 51 compares the current load to zero. If the current load is greater than 0, control continues with step 316 where the control system 50 subtracts a tenth load value $I_{10}$. For example, the tenth load value $I_{10}$ can be 12 Amps. In a preferred embodiment, step 296 subtracts only part of the tenth load value $I_{10}$ to reach zero if necessary. If the current load is equal to zero, control continues from step 314 to step 216.

As can be appreciated, the specific current load increases and decreases can be varied from those described above. Factors that impact the selection of these values include the type of fuel cell, the dimensions of the fuel cell plates, the anticipated reliability and life of the fuel cell and other factors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A method of controlling a frozen fuel cell stack at start-up, comprising:
   delivering dry anode and cathode reactants to said fuel cell stack and delivering an airbleed with said dry anode reactants;
   drawing a current from said fuel cell stack using a current load;
   determining a minimum cell voltage of cells of said fuel cell stack;
   controlling said current drawn from said fuel cell stack by one of selectively increasing said current by a first current value when said minimum cell voltage is above a first voltage value and selectively decreasing said current by a second current value when said minimum cell voltage is below said first voltage value, wherein the current is increased or decreased in incremental steps;
   maintaining said current at a fixed level after said controlling;
   repeating said determining, controlling, and maintaining at a predetermined rate; and
   stopping said repeating when said current is greater than a current setpoint.

2. The method of claim 1 wherein said determining comprises measuring a cell voltage of each of said cells of said fuel cell stack and selecting a minimum one of said cell voltages.

3. The method of claim 1 wherein said increasing comprises:
   selectively increasing said current by said first current value when said minimum cell voltage is between said first voltage value and a second voltage value, wherein said second voltage value is greater than said first voltage value; and
   selectively increasing said current by a third current value when said minimum cell voltage is greater than said second voltage value, wherein said third current value is greater than said first current value.

4. The method of claim 1 wherein said decreasing comprises:
   selectively decreasing said current by said second current value when said minimum cell voltage is between said first voltage value and a third voltage value, wherein said third voltage value is less than said first voltage value; and
   selectively decreasing said current by a fourth current value when said minimum cell voltage is less than said third voltage value, wherein said fourth current value is greater than said second current value.

5. The method of claim 1 further comprising:
   measuring an outlet temperature of an anode of said fuel cell stack; and
   humidifying said reactants when said outlet temperature reaches a predetermined value.

6. The method of claim 1 further comprising:
   measuring an outlet temperature of an anode of said fuel cell stack; and
   discontinuing said airbleed when said outlet temperature reaches zero degrees Celsius.

* * * * *